United States Patent
Ehrler et al.

(10) Patent No.: US 8,869,053 B2
(45) Date of Patent: Oct. 21, 2014

(54) ORGANIZER FOR MANAGING EMPLOYEE TIME AND ATTENDANCE

(75) Inventors: Stefan Ehrler, Biblis (DE); Birgit Ludwig, Walldorf (DE)

(73) Assignee: SAP AG, Walldorf (DE)

( * ) Notice: Subject to any disclaimer, the term of this patent is extended or adjusted under 35 U.S.C. 154(b) by 131 days.

(21) Appl. No.: 13/543,042

(22) Filed: Jul. 6, 2012

(65) Prior Publication Data

US 2014/0013252 A1   Jan. 9, 2014

(51) Int. Cl.
*G06F 3/048*   (2013.01)

(52) U.S. Cl.
USPC ........... 715/764; 715/765; 715/780; 715/810; 705/7.11; 705/7.12; 705/7.13; 705/7.14; 705/7.42

(58) Field of Classification Search
USPC .............. 705/7.11–7.14, 7.25, 7.38, 7.42, 32; 715/234, 219, 256, 764, 810, 835, 221, 715/222, 224, 226
See application file for complete search history.

(56) References Cited

U.S. PATENT DOCUMENTS

| | | | |
|---|---|---|---|
| 6,954,737 B2 * | 10/2005 | Kalantar et al. | 705/50 |
| 8,060,394 B2 * | 11/2011 | Woodings et al. | 705/7.13 |
| 8,126,788 B2 * | 2/2012 | Pappas et al. | 705/32 |
| 8,271,531 B2 * | 9/2012 | Karlsen et al. | 707/786 |
| 8,359,221 B2 * | 1/2013 | Gala | 705/7.16 |
| 2003/0216957 A1 * | 11/2003 | Florence et al. | 705/11 |
| 2005/0137925 A1 * | 6/2005 | Lakritz et al. | 705/8 |
| 2009/0099899 A1 * | 4/2009 | Thompson et al. | 705/9 |
| 2009/0319926 A1 * | 12/2009 | Chakra et al. | 715/764 |
| 2010/0332271 A1 * | 12/2010 | De Spong | 705/7 |
| 2011/0029420 A1 * | 2/2011 | Bianco et al. | 705/32 |
| 2012/0215578 A1 * | 8/2012 | Swierz et al. | 705/7.14 |
| 2013/0031184 A1 * | 1/2013 | Avitabile et al. | 709/206 |
| 2013/0110565 A1 * | 5/2013 | Means et al. | 705/7.11 |

* cited by examiner

*Primary Examiner* — Doon Chow
*Assistant Examiner* — Wendy Nicholas
(74) *Attorney, Agent, or Firm* — Fountainhead Law Group, PC

(57) ABSTRACT

Embodiments relate to systems and methods allowing comprehensive access to, and management of, workforce data from a remote location. Embodiments may allow communication of information between a mobile device of a supervisor or section leader working at a remote site, and a centralized information repository. Embodiments allow the user to communicate with a central enterprise resource management (ERM) application in order to receive and update relevant employment information. Utilizing certain embodiments, a supervisor working remotely may be able to quickly identify work schedules of various staff members, as well as gain access to information such as employee time management data, shift assignments, overtime, skill sets, and absences. Certain embodiments may allow a mobile device to display and/or modify information such as work schedules, time entries, clock-in/clock-out times, available/consumed vacation time, and on-call lists of replacement candidates possessing appropriate skills.

17 Claims, 17 Drawing Sheets

FIG. 2

| | MON 19 MAY | TUE 20 MAY | WED 21 MAY | THU 22 MAY | FRI 23 MAY |
|---|---|---|---|---|---|
| Group Title | | | | | |
| Ankele, S +45 | free | FR 2 Paper Machine | FR 2 Paper Machine | FR 2 Paper Machine | FR 2 Paper Machine |
| Levedeva, O +45 | FR 1 Paper Machine | ⊕ sick | ⊕ sick | FR 1 Paper Machine | FR 1 Paper Machine |
| Mielf, C +45 | SP 1 Paper Machine | SP 1 Paper Machine | SP 1 Paper Machine | SP 1 Paper Machine | SP 1 Paper Machine |
| Bender, K +45 | free | free | free | SP 1 Paper Machine | |
| Group Title | | | | | |
| Beurer, J +45 | ✴ vac | ✴ vac | ✴ vac | ✴ vac | ✴ vac |
| Eggler, S +45 | FR 1 Paper Machine | FR 1 Paper Machine | FR 1 Paper Machine | FR 1 Paper Machine | FR 1 Paper Machine |
| Geber, J +45 | SP 1 Paper Machine | SP 1 Paper Machine | SP 1 Paper Machine | SP 1 Paper Machine | SP 1 Paper Machine |
| Groth, S +45 | ✴ vac | ✴ vac | SP 1 Paper Machine | SP 1 Paper Machine | SP 1 Paper Machine |
| Group Title | | | | | |
| Grothus, F | FR 2 Paper Machine | FR 2 Paper Machine | FR 2 Paper Machine | FR 2 Paper Machine | FR 2 Paper Machine |

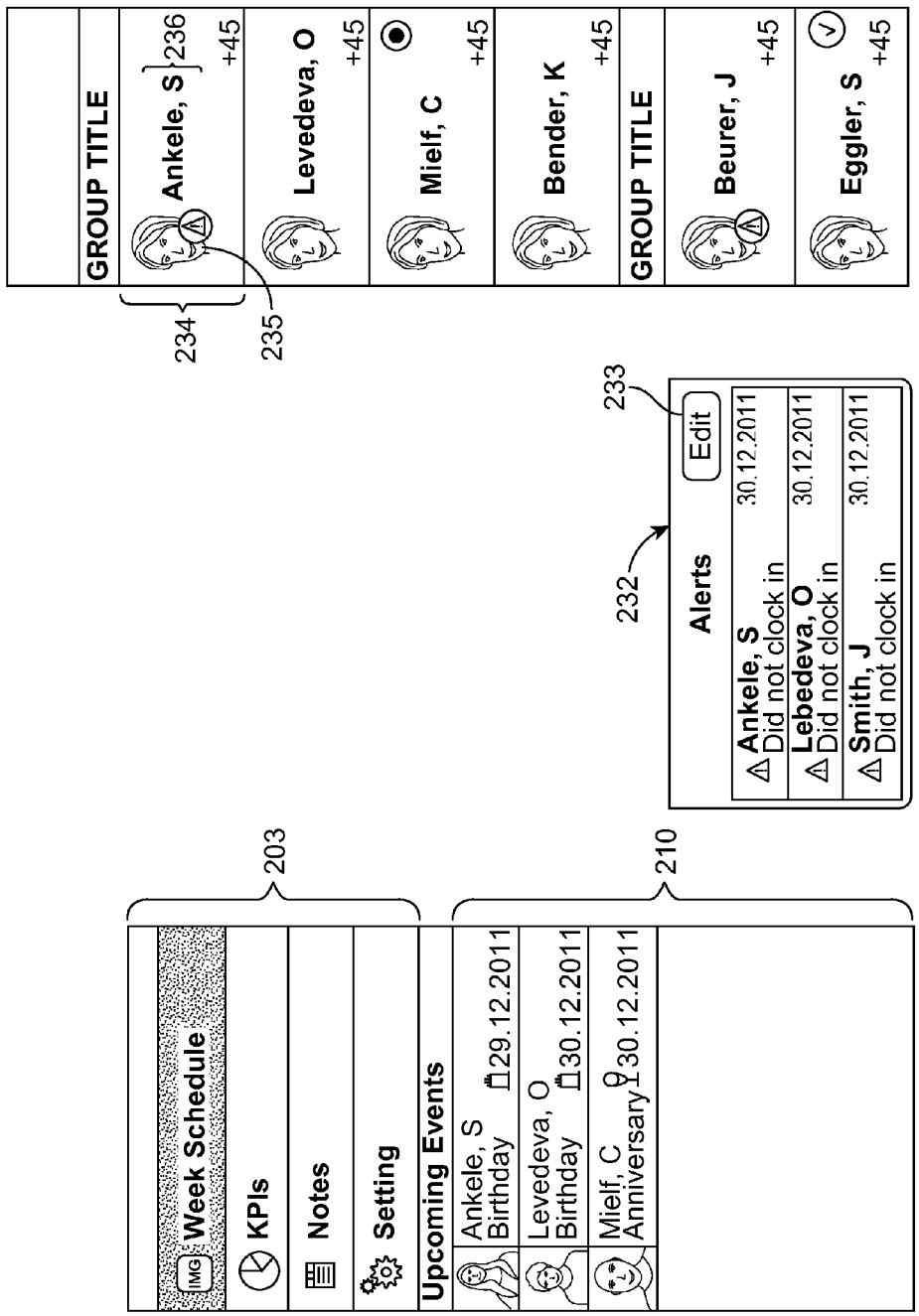

Menu | Today
9:41 AM
< Week 51, 2012 >

| | MON 19 MAY | TUE 20 MAY | WED 21 MAY | THU 22 MAY | FRI 23 MAY | SAT 24 MAY | SUN 25 MAY |
|---|---|---|---|---|---|---|---|
| Total Planned / Absences | 45/2 | 45/2 | 46/1 | 47/0 | 47/0 | 47/0 | 47/0 |
| for FR1 | 12/0 | 12/0 | 12/0 | 12/0 | 12/0 | 12/0 | 12/0 |
| for FR2 | 8/1 | 8/1 | 9/0 | 9/0 | 9/0 | 9/0 | 9/0 |
| for SP1 | 11/1 | 11/1 | 11/1 | 12/0 | 12/0 | 12/0 | 12/0 |
| for SP2 | 7/0 | 7/0 | 7/0 | 7/0 | 7/0 | 7/0 | 7/0 |
| for NIT | 7/0 | 7/0 | 7/0 | 7/0 | 7/0 | 7/0 | 7/0 |
| Group Title | | | | | | | |
| Ankele, S  +45 | free | FR 2 Paper Machine | FR 2 Paper Machine | FR 2 Paper Machine | FR 2 Paper Machine | free | free |
| Levedeva, O  +45 | FR 1 Paper Machine | ✚ sick | ✚ sick | FR 1 Paper Machine | FR 1 Paper Machine | FR 1 Paper Machine | FR 1 Paper Machine |
| Mielf, C  +45 | SP 1 Paper Machine | SP 1 Paper Machine | SP 1 Paper Machine | SP 1 Paper Machine | SP 1 Paper Machine | free | free |
| Bender, K  +45 | free | free | free | | | | |
| Group Title | | | | | | | |
| Beurrer, J  +45 | ✱ vac | ✱ vac | ✱ vac | ✱ vac | ✱ vac | free | free |
| Eggler, S  +45 | FR 1 Paper Machine | FR 1 Paper Machine | FR 1 Paper Machine | FR 1 Paper Machine | FR 1 Paper Machine | FR 1 Paper Machine | free |
| Geber, J | SP 1 Paper Machine | SP 1 Paper Machine | SP 1 Paper Machine | SP 1 Paper Machine | SP 1 Paper Machine | free | free |

| Cancel | Edit Group | Done |

Production (you can edit the group name)

Add/remove employees to and from the group by tap/untapping the name

- ☐ Ankele, S General ○
- ☐ Bender, K General ◎
- ☐ Beurer, J General ◎
- ☐ Eggler, S General ◎
- ☐ Geber, J General ○
- ☐ Groth, S General ○
- ☐ Grothus, F General ○
- ☐ Hoffman, M General ◎

FIG. 17

| Employees | Productive Time (hrs) ▲ | Planned Time (hrs) | Working Time Account (hrs) | Working Hours per Week | Flextime Account (hrs) | Remaining Leave (hrs) | Leave Entitlement (days) |
|---|---|---|---|---|---|---|---|
| Group Title | | | | | | | |
| Ankele, S | 0 | 34 | 1 | 23 | 0 | 3 | 2 |
| Levedeva, O | 34 | 89 | 23 | 67 | 3 | 0 | 3 |
| Mielf, C | 231 | 23 | 65 | 3 | 45 | 56 | 4 |
| Bender, K | 45 | 143 | 65 | 78 | 4 | 0 | 3 |
| Beurer, J | 4 | 0 | 23 | 4 | 0 | 2 | 3 |
| Group Title | | | | | | | |
| Eggler, S | 169 | 3 | 43 | 10 | 8 | 4 | 3 |
| Geber, J | 4 | 67 | 5 | 43 | 4 | 0 | 3 |
| Groth, S | 50 | 2 | 67 | 30 | 78 | 23 | 3 |
| Grothus, F | 32 | 70 | 21 | 59 | 2 | 5 | 5 |
| Hoffman, M | 87 | 23 | 76 | 4 | 0 | 11 | 4 |
| Group Title | | | | | | | |
| Levedeva, O | 2 | 79 | 8 | 5 | 0 | 13 | 2 |
| Mielf, C | 0 | 98 | 10 | 7 | 5 | 0 | 4 |
| Joe, B | 1 | 0 | 12 | 0 | 0 | 32 | 3 |

FIG. 18

FIG. 19

ORGANIZER FOR MANAGING EMPLOYEE TIME AND ATTENDANCE

BACKGROUND

Embodiments of the present invention relate to workforce management, and in particular, to systems and methods allowing organization of employee time and attendance information.

Unless otherwise indicated herein, the approaches described in this section are not prior art to the claims in this application and are not admitted to be prior art by inclusion in this section.

Supervisors or section leaders seek to manage staff most effectively, quickly, and decisively, in order to ensure their greatest effectiveness. However, supervisors or section leaders and managers increasingly operate in diverse geographic environments, sometimes remote from the location of their reporting personnel, and/or remote from in-house systems for staff activity monitoring.

The present disclosure addresses these and other issues with systems and methods for managing employee time and attendance.

SUMMARY

Embodiments relate to systems and methods allowing comprehensive access to, and management of, workforce data from a remote location. Embodiments may allow communication of information between a mobile device of a supervisor working at a remote site, and a centralized information repository. Embodiments allow the user to communicate with a central enterprise resource management (ERM) application in order to receive and update relevant employment information. Utilizing certain embodiments, a supervisor working remotely may be able to quickly identify work schedules of various staff members, as well as gain access to information such as employee time management data, shift assignments, overtime, skill sets, attendances and absences. Certain embodiments may allow a mobile device to display and/or modify information such as work schedules, time entries, clock-in/clock-out times, available/consumed vacation time, and on-call lists of replacement candidates possessing appropriate skills.

An embodiment of a computer-implemented method comprises, causing a view engine in a portable electronic device, to obtain workforce information from a remote centralized storage medium, and causing the view engine to display the workforce information on the portable electronic device. The view engine is caused to receive input from the user to change the workforce information, and updated workforce information is communicated from the portable electronic device to the remote centralized storage medium.

An embodiment of a non-transitory computer readable storage medium, embodies a computer program for performing a method comprising, causing a view engine in a portable electronic device, to obtain workforce information from a remote centralized storage medium, and causing the view engine to display the workforce information on the portable electronic device. The view engine is caused to receive input from user to change the workforce information, and updated workforce information is communicated from the portable electronic device to the remote centralized storage medium.

An embodiment of a computer system comprises one or more processors and a software program executable on said computer system. The software program is configured to cause a view engine in a portable electronic device, to obtain workforce information from a remote centralized storage medium. The view engine is caused to display the workforce information on the portable electronic device. The view engine is caused to receive input from user to change the workforce information. Updated workforce information is communicated from the portable electronic device to the remote centralized storage medium.

Certain embodiments may further comprise causing the view engine to perform an operation upon the workforce information to generate the updated workforce information.

In some embodiments, the operation performed by the view engine may be to calculate a sum.

Particular embodiments may further comprise causing the view engine to generate an alert based upon the user input.

In some embodiments, the workforce information may comprises employee-specific information selected from a total number of vacation days, a number of vacation days already taken, a number of planned vacation days, a number of instances of delayed clock-in, a shift schedule, time management information, or an amount of overtime.

According to particular embodiments, the workforce information may comprise employee-specific contact information.

In some embodiments, the workforce information may comprise employee-specific information selected from a skill set, a credential, or a previous job role.

The following detailed description and accompanying drawings provide a better understanding of the nature and advantages of particular embodiments.

BRIEF DESCRIPTION OF THE DRAWINGS

FIG. 2 is a screen shot showing an interface including a navigation panel

FIG. 3 shows an enlarged view of a week schedule panel of an interface.

FIG. 4 shows an alert popover view.

FIG. 5 is a screen shot including a week schedule panel and an employee business card portion.

FIG. 6 shows a week schedule panel including a pull-down summary.

FIG. 7 shows a week schedule panel.

FIG. 9 shows a time correction window.

FIG. 10 shows a popover opening to allow user date selection in a time correction window.

FIG. 11 shows a screen shot of editing employee details as a list of notes.

FIG. 12 is a screen shot showing an individual note.

FIG. 13 is a view of a screen shot allowing selection of employee time management statistics.

FIG. 15 shows the navigation panel including a settings option available for changing the settings.

FIG. 16 shows the settings menu including a grouping option.

FIG. 17 is a screen shot listing members of a group.

FIG. 18 is a screen shot showing time management statistics in column form.

FIG. 19 is a screen shot showing an employee profile.

DETAILED DESCRIPTION

Described herein are techniques for automated versioning of software on a client. The apparatuses, methods, and techniques described below may be implemented as a computer program (software) executing on one or more computers. The computer program may further be stored on a computer readable medium. The computer readable medium may include instructions for performing the processes described below.

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
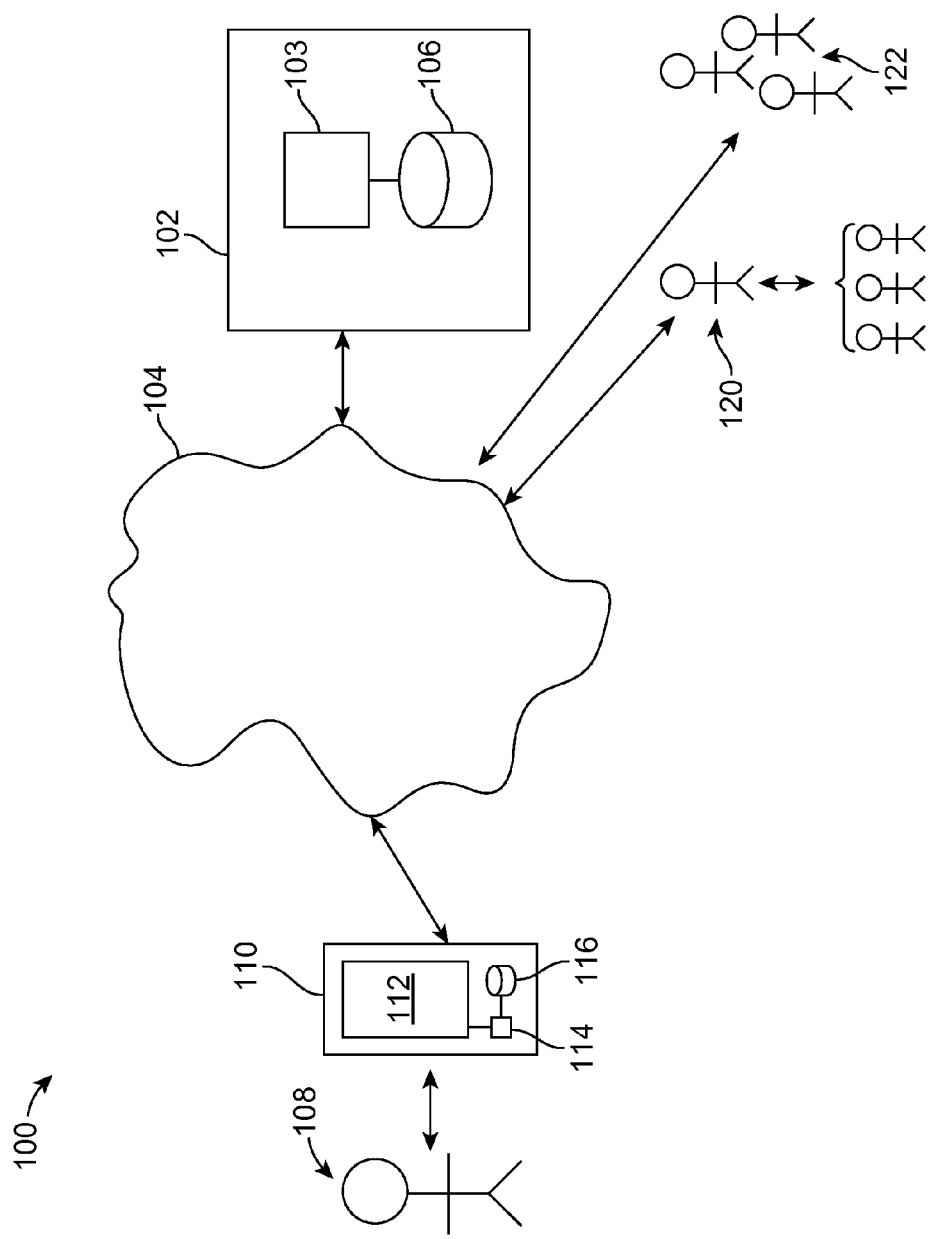
FIG. 1 shows a simplified schematic diagram of a system for personnel management according to an embodiment.

FIG. 1 shows an embodiment of a workforce management system 100 according to an embodiment. In particular, as discussed in detail below a server 102 is linked with a communications network 104. This network may comprise a mobile infrastructure, and/or a wireless local area network (LAN) within a limited geographic area (e.g. a manufacturing plant).

The server 102 includes a processor 103 that may be configured to run an Enterprise Management Resource (ERM) application. Accordingly, the processor 103 is in communication with a data warehouse 106 that is configured to store data comprising variety of types of workforce information for plurality of employees. This data may be organized according to data structure comprising a database with tables.

A remote user 108 such as a shift supervisor (or section leader), is able to interact with the server via a mobile computing device 110 and the communications network. The mobile computing device includes a display 112 and an input device (such as a touch screen and/or keyboard) that is in communication with a processor 114 and at least one non-transitory computer readable storage medium 116.

The storage medium has stored thereon computer code configured to instruct the processor to function as a view engine, creating and displaying various views of workforce information as is discussed in detail below.

The storage medium also has stored thereon computer code configured to instruct the processor to function as a data collection engine to receive information entered by the user. Such information entered by a user into this mobile device, is then transmitted through the communications network to the central server, where the data warehouse may be updated accordingly.

According to many embodiments, data and primary calculations (such as the key performance indicators—KPIs discussed below) may be performed on the server rather than the frontend. In some embodiments, simple sums like XLS may be done on the frontend.

Updates may occur automatically and frequently on the server in a synchronous manner. The mobile device may thus be seen as a mobile UI with fewer features on the mobile device due to data privacy concerns. Having the data resident on the server instead of the frontend, allows many people rapid and easy access to the updated data on the server.

As discussed below in connection with the example, particular embodiments of workforce management systems and methods may provide the user with an interface including certain screens/views displaying relevant information. One possible view is a weekly schedule showing employee scheduling for particular work shifts. Another possible view is a view of time management statistics for a particular employee, for example billing codes indicating project or type of work performed. Still another possible view for an interface according to an embodiment, allows display and editing of notes of information relating to specific incidents and/or progress achieved. Yet another possible view available to an interface, is of upcoming events (e.g. birthdays/anniversaries). Other views include profiles of specific employees including contact, skill set, credentialing, and attendance information. An alert view may allow the creation, monitoring, and editing of alerts to be sent out to others based upon workforce data.

As shown in FIG. 1, storage of workforce information in a centralized location, facilitates access by other users. Examples of such other users include supervisors 120 responsible for different shifts/teams, as well as other departmental organizations 122 (e.g. payroll, HR) having a need to routinely access accurate, up-to-date workforce information.

By accessing, reviewing, and changing workforce information stored in a central server utilizing a mobile device, a user may be able to perform a relevant employee management tasks with greater accuracy and speed, and less effort. Examples of various types of workforce information that may be made available to users according to various embodiments, are now described.

Specifically, personnel supervisors and managers may typically be called upon to address panoply of workforce issues. For example, a manager may seek to perform tasks such as:

correcting clock in/out times on behalf of employees;

entering absence or attendance data (e.g. sickness, vacation, training, shift changes);

inspecting an overview of time management statistics of employees;

sending or receiving time management alerts to other team members;

reviewing/updating employee profile data;

reviewing/modifying time statement information.

Accordingly, embodiments provide systems and methods allowing a user to organize and manage workforce information remote from a central storage location. Users may employ such systems to achieve various goals, including but not limited to workforce balancing and reduction in labor costs (e.g. overtime), while satisfying workplace productivity demands.

For example, particular embodiments may be employed to control labor cost. Employee absence can take many forms: vacation; sick time; late arrival and early departure; extended breaks; union-negotiated leave; and government-regulated leave. Each of these absence types (whether planned, incidental, or extended) carries with it its own costs, management demands, risks, and productivity losses. By providing responsible parties with accurate, up to date information regarding employee status, embodiments allow the most efficient management of labor costs.

Embodiments may also be employed to maintain productivity in the face of unexpected events. For example, where a key employee is absent due to sickness, embodiments may allow a user to rapidly access a call list that discovers and displays the most appropriate employees available to fill an open shift, based upon factors such as skill sets, credentials, company policy, and employee preferences. Managers can then contact employees directly through their mobile devices via channels such as voice, email, or text.

Embodiments may also be employed to fulfill workforce analytics and reporting demands. For example, rather than having to return to a particular physical location in order to prepare reports on workforce issues, a remote supervisor will have the necessary information already in hand. This ease of access to relevant information can promote the use of labor analysis tools to assess the impact on labor budgets and productivity. Labor costs may be controlled by aligning business performance to predefined, best-practice workforce categories like overtime, absence, and schedule effectiveness.

Embodiments may be configured to manually or automatically notify others of workforce issues, for example by pushing notification to frontline managers. Email alerts may inform managers when employees fail to clock in on time, or when other absence-related issues arise.

A push notification may inform a manager that one or more employees did come unexpected to work and have either clocked in late or not yet clocked-in. The manager receives the push notification on his device and can directly handle the alert.

Via a setting functionality, it may be possible to automatically send a notification that a certain number of minutes after the expected clock-in, no clock-in has in fact occurred.

Through the use of careful record keeping and alert functionality, embodiments may allow prompt notification of employees having historical workforce issues. System embodiments may provide push alerts to responsible managers quickly identifying employees having specific issues. Examples of errors in time evaluation which may be quickly noted by particular embodiments, include but are not limited to:

missing clock-in;
missing clock-out;
missing clock-break in/-out;
violation for off-time (minimal hours between end of last work and begin of next work too low), for example for driver rest in the trucking industry;
overtime: worked hours>approved contingent for overtime.

Various embodiments allow error messages sent to a target group, to be customized and mapped as appropriate.

In certain situations, a manager may seek to check current availability of team members to see who is actually in/available, and who is expected to come in soon. The manager may need to check if all tasks can be fully staffed to complete the work with the right balance of the workforce (not too many employees and not too few).

Accordingly, embodiments may provide a workforce overview allowing rapid identification of employees by appearance, name, and contact information. The overview may also identify the attendance/availability status of various employees. Such status may indicate:

employees clocked-in and available to perform tasks immediately;
employees expected to clock-in soon;
employees unexpectedly at work (no clock out);
employees on-call;
employees not on-call but potentially available to work;

Embodiments may also provide a user with specific information regarding job tasks and duties of various employees. Such information may include but is not limited to:

assigned job/task of the employees;
previous job/task experience;
existence of multiple job/task assignments;
sum of people at work for this Job/Task Based upon workforce information received according to particular embodiments, a user can rapidly and effectively modify the assignment status of various employees to meet existing needs.

Embodiments may also provide a user with specific temporal and/or geographic employee information. Examples of such information include but are not limited to:

location assigned to employee;
sum of employees at a particular location;
employee schedules, including planned duration, starting times, and leaving times;

Embodiments may provide additional functionality, such as the ability to filter information (e.g. by location, availability, skill set, and/or overtime), as well as the ability to automatically generate alerts or other actions based upon conditional events.

One duty of a workforce manager may to be correct employee time entries. Specifically, the manager is responsible to ensure that employees have entered the correct actual working times in the system. Thus when a clock-in/clock-out terminal is inoperative or the employee has forgotten to clock-in/out, the manager may have to enter and correct the time bookings on behalf of the employee.

Where a user (manager/supervisor) is being asked to perform a time correction, the manager may be informed (e.g. via 'alerts') that a time booking is missing. After checking with the employee, the manager may enter this information ad hoc. This may be done by opening a popover to enter the time booking for clock-in/-out, once the relevant context (scheduling) information for that day has been checked for planned working time, absences, existing time events, etc.

Similarly, a personnel manager or supervisor may be requested to enter absence/attendance information. For example, a manager may receive a call from the employee (push), or be informed by a colleague, that an employee is sick and will not come to work. A possible return date is not known pending a medical evaluation.

Under such circumstances, a user may access the system and update the attendance information for the employee to reflect the illness. Moreover, a provision may be made to allow the user to enter the illness type as "w/o certificate".

The status of the employee is automatically updated by the system to be non-available. Moreover, the absence entered by the user may in turn prompt the system to automatically begin to search available information for substitute available personnel with the same skills, or other proposed solutions.

For example, a list of employees to serve as possible replacements may be provided to the user, including employees who are on-call, planned for the next shift, potentially available (w/o violation of any laws), and/or available without or with minimal overtime. Through the workplace management system, the user can contact the identified replacement, and then automatically update the centralized data warehouse to reflect the new status of the replacement employee.

In certain scenarios, a supervisor may seek to inspect time statistics for one or more employees, so as to assess staff reliability. In response to user input to a mobile device, embodiments may thus provide to the user a display employees listed according to a highest amount of no-shows and late at work attendance figures.

Examples of other types of top down lists that may be provided by various embodiments, include but are not limited to, the following employee information:

vacation & leave;
total vacation days (e.g. contingent e.g Germany, or current accrual e.g. United States);
days already taken;
days planned in the future;
days open;
total contingent for leave, leave accrual;
# of instances of delayed clock-in;

sum of hours, minutes of the delay per month of the employee
 sum of overtime hours
 sum of leaving days, hours.
 sum of training days, hours.

Embodiments may provide for the ability of a user to view and edit an employee profile. Specifically, a manager may be responsible to give advice and information to the employee. Often, employees not having regular access to internal computer systems may approach a manager to ask for details of their current workforce status, including but not limited to time statement overtime hours, vacation days left, and other possible details.

In such a scenario, utilizing a mobile device the manager may access the workforce data stored in the centralized server, and select the employee for whom the manager would like to give advice. The manager can then use a time statement function to open a summary of the time statement for this employee, and provide this information to the employee. In some embodiments after checking (and possibly verifying through other available data) the relevant information, the manager may tell the employee the figure, or even generate a paper or electronic time statement document (such as in PDF form) to give to the employee.

In certain embodiments, the time statement for a particular employee comprises a reporting engine configured in the backend of the system (e.g. at the centralized server). Users may configure the time statement to reflect time information relevant for the employee.

EXAMPLE

The following figures show a series of mobile device screen shots of one example of a personnel management system. FIG. 2 shows a screen shot 200 including a panel 203 offering navigation between a week schedule, a day schedule, time management statistics (e.g. KPIs), notes, settings, and upcoming events. In this particular view, the week schedule 202 and the upcoming events 210 are displayed together with the navigation panel. FIG. 3 shows an enlarged view of the navigation and upcoming events panels.

Each navigation panel contains information relevant to the subject matter of that panel. For example, the upcoming events shows birthday and anniversary information for a period of two weeks from the current date.

The navigation targets may be accessed via tapping a touch screen. In the panel the canvas area will then be changed to display the selected screen. Open/close animations may be provided via the menu icon 224 in the toolbar 226.

The bottom of the navigation panel may include a time stamp reflecting a last update, and a refresh button. A user can refresh the complete work schedule information.

Utilizing the navigation panel, a user may search for information such as names, tags, skills, valid workplace assignments. Search results may be displayed in the panel navigation.

An alert icon can be present on the toolbar 226. As shown in FIG. 6, an alert icon 227 can display the number of all alerts of all persons. This number can reflect alerts over a period of time (e.g. from the previous two weeks). After display, the number may change appearance, e.g. color.

Via clicking on the alert icon, a popover as in FIG. 4, displays all alerts from the time period. In the popover 232, the user can tap on a particular alert to navigate to the employee detail screen (discussed below). Using this series of steps, a user may handle time correction of missing clock-in/out information.

After opening the alert popover, the number of the alerts at the icon may no longer be displayed. The popover may include an edit button 233 to allow editing of the popover information.

The week schedule panel 202 includes an employee business card portion 234 (also shown in FIG. 5) displaying employee information. Examples of such information include employee availability status, an employee picture 235 (or placeholder if no picture is available), the full name 236 of the employee (which may be based on human resources master data customizing). The business card may include an alert-icon in case there are any error messages from the time evaluation for this particular person.

The business card portion may indicate an availability status. For example, the availability status may be displayed by an icon, which may be colored. Here, a check mark indicates employee status as clocked-in, a dot indicates employee status as missing, and no icon indicates the employee as being clocked out. The current status on the business card may be updated through the KPI information.

Employees may be grouped together under certain headings (e.g. "My Team"). Employees are alphabetically sorted and then displayed for particular groups. Additional groups can be created in the settings—under the grouping menu choice.

Figure 19:
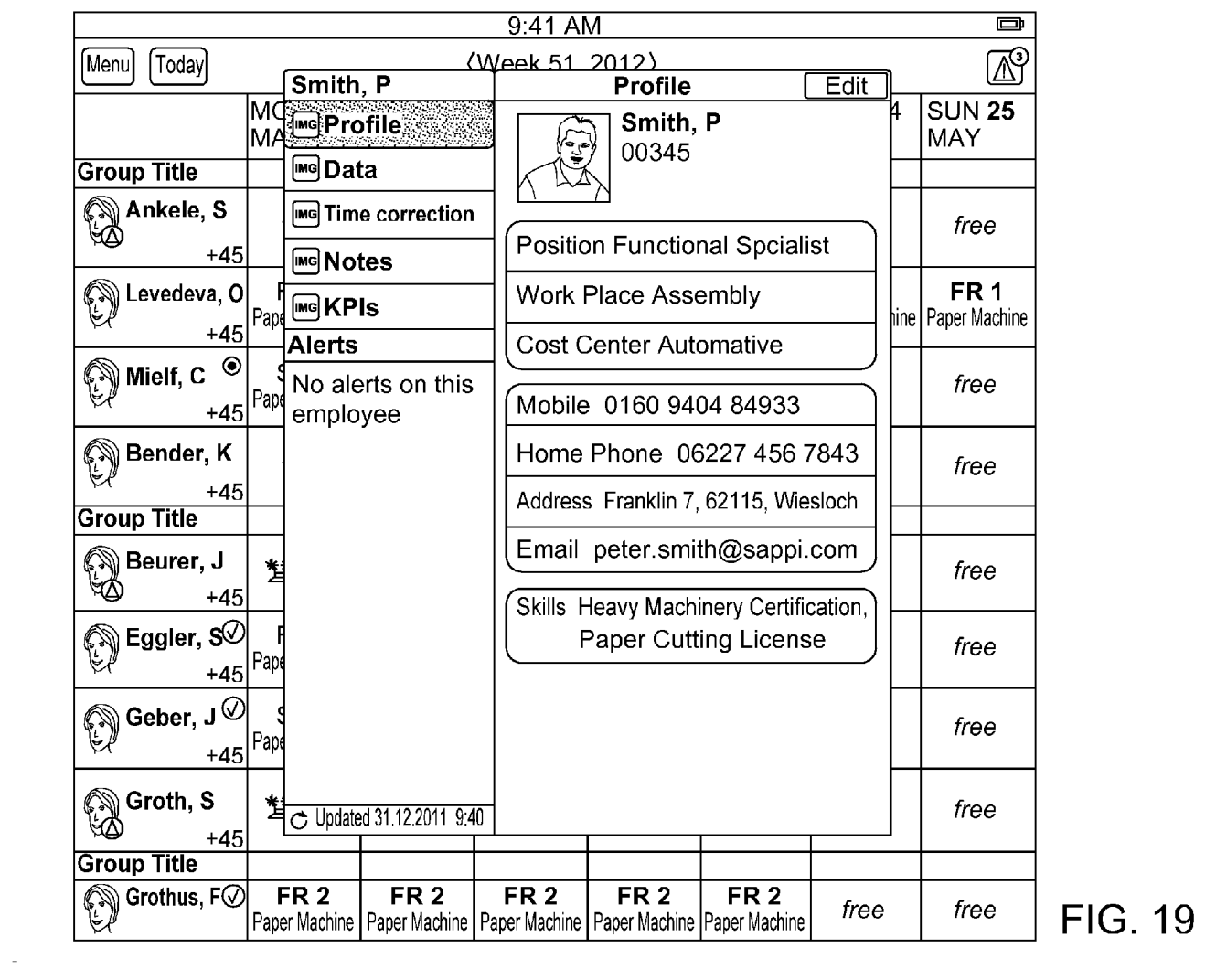

Tapping on the employee business card panel in turn navigates to the employee profile detail screen discussed below in connection with FIG. 19.

As shown in FIG. 6, the week schedule panel includes a quick availability check functionality comprising a pull-down summary 237 for each column. The pull down summary lines may be displayed via button in the toolbar (e.g. 'Show Preview'/'Hide Preview').

The pull down summary may provide a quick counter of how many employees are present/not present per shift. Examples of information that can be displayed include planned at work (# of employees with working shifts {>0 productive hours} for this day), not at work (# of employees with any kind of full-day absence or full-day attendance for this day), and per shift (at work/not at work) same as above but listed by working shifts (>0 hours).

The week schedule navigation panel also includes a week shift plan overview portion 238 comprising a plurality of cells 240. This displays a start day for week view. The content of cells of the week schedule panel may include but is not limited to, the shift name 241 (e.g. FR1), the workplace 243 (e.g. "Paper Machine"), an indicator in case of part-day time information exists, a color code, status icons (e.g. sick, vacation, training, travel). Free-shifts (=0 working hours) may be displayed with small letters.

Flip or paging ('<' and '>' buttons) allow access to the next or previous week. Clicking on the week in the header may open a popover to enter a specific week.

Figure 7:
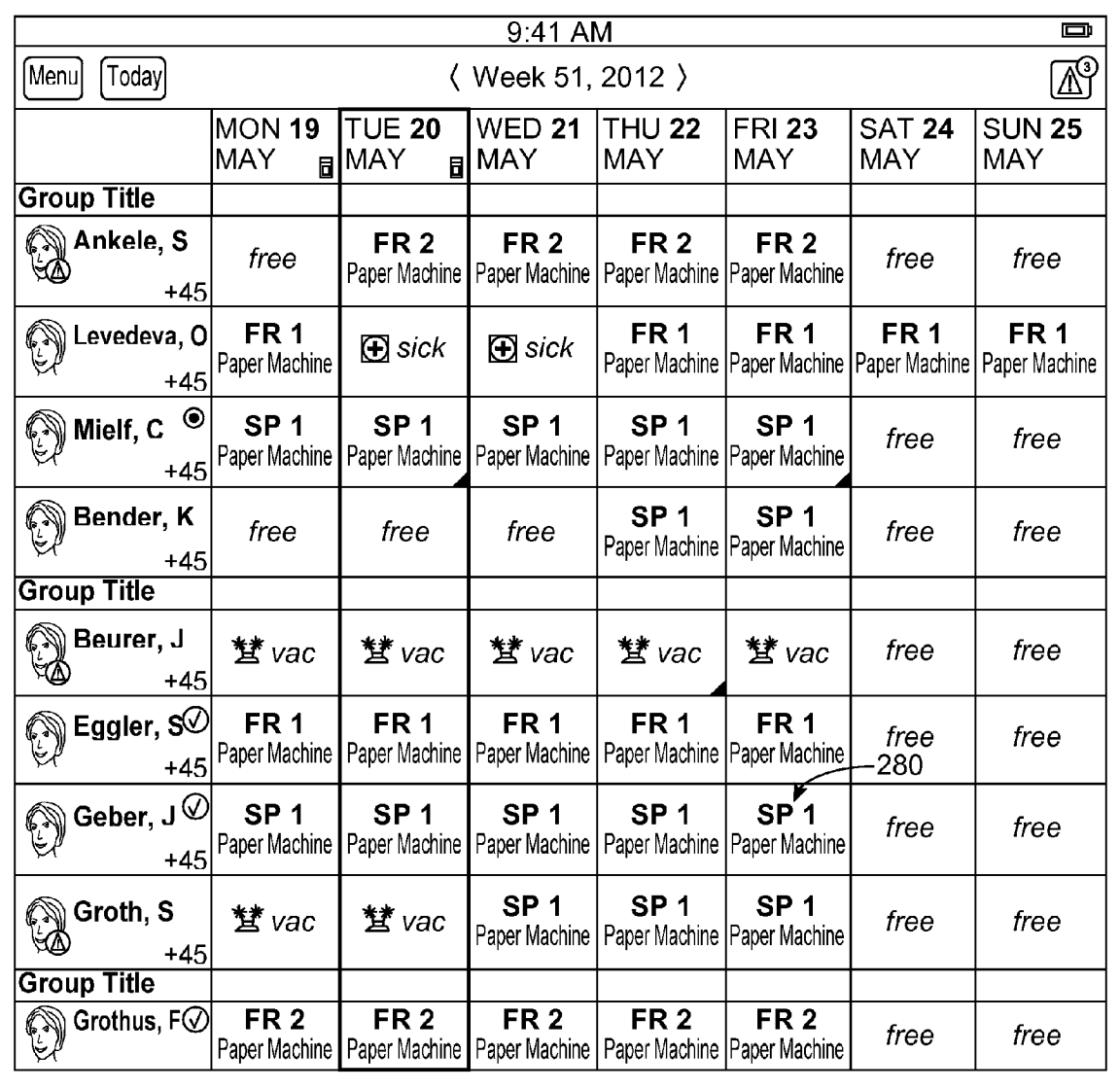
Figure 8:
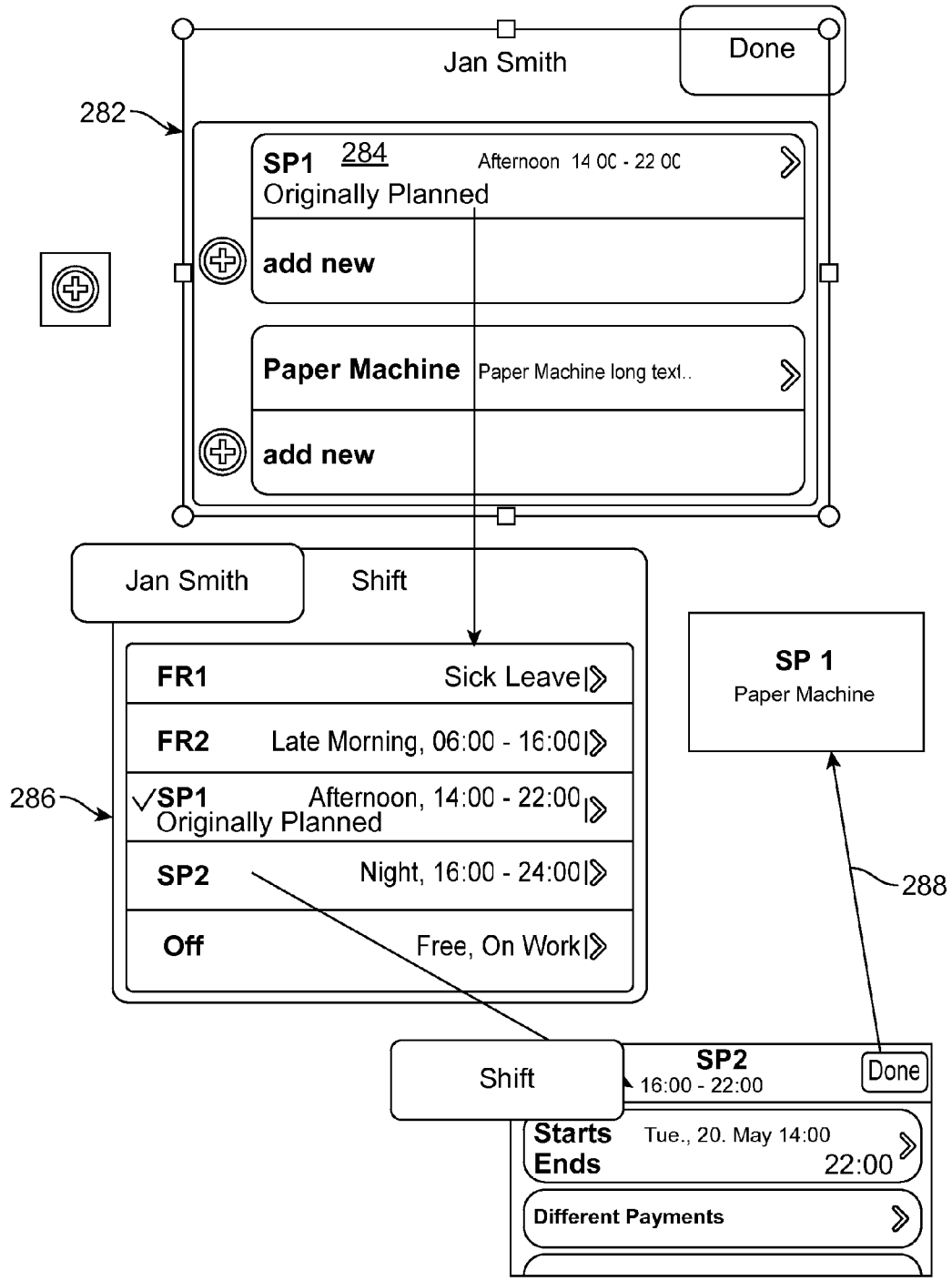
FIG. 8 shows popover detail information obtained by tapping at one cell in the week schedule panel.

Tapping at a cell, opens a popover where the user can see and change the details for certain information (e.g. absence, attendance, shift, workplace). For example, FIG. 8 shows popover detail information obtained by tapping at one cell 280 in the week schedule shown in FIG. 7. The popover 282 opens with display the time data overview for that day and that employee.

In particular the first entry 284 displays the main domain time information for the day: Shift, Text of shift, begin and end time of shift, and a chevron.

Use of the edit button ("+") in the toolbar, allows an edit mode with a new line for time data and new line for workplaces. These lines appear with the '+'.

In edit mode shown in the view, all existing additional time data below the first line gets the '−' button at the left for delete. Text for '+' is "Time data"/"Workplace assignment". Tapping at the 'new' line shall swipe in the same F4 list of shifts as in the first line. Tapping at the first line (shift cell) swipe in the F4 list of all shifts (incl. working shifts, absences and attendance. The chevron may be used to visualize the change option for the shift Tapping at a shift in the F4 list of shifts, navigates to the details screen 286 of the tapped shift. Once a user is finished with the details screen of the shift, he or she may navigate 288 back to the weekly schedule with the updated shift information.

Figures 9, 10:
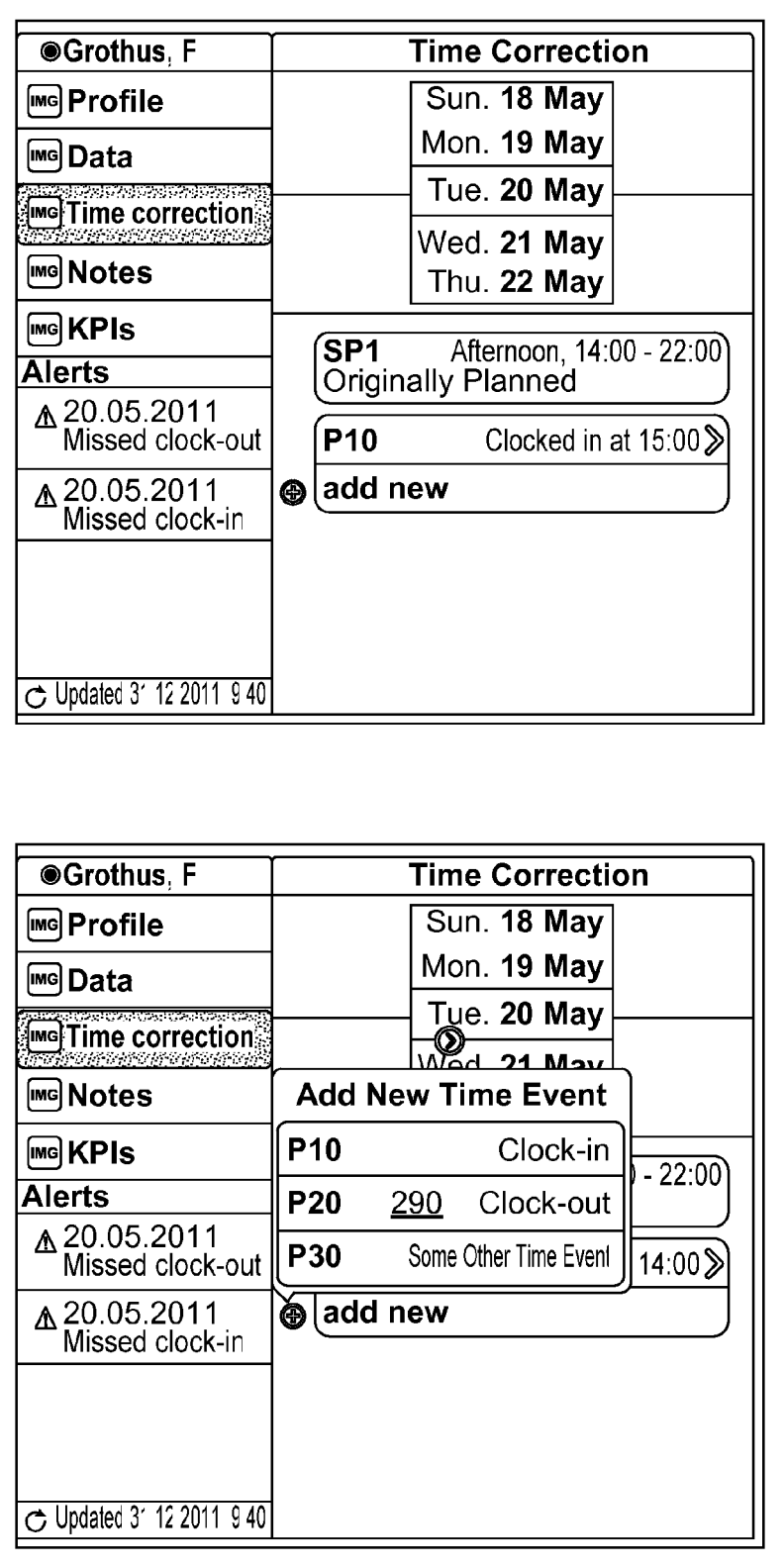

FIG. 9 shows a starting view of a process of editing employee details in the form of a correction of employee time. Time correction shall be displayed in case the employee is ready for positive time management.

As shown in FIG. 10, the user may tap at the field, and a popover 290 will open with the wheel or menu choice for date selection. The user may close the popover with done, and write the select date into the field. The system will update the shift and time event information below for that selected day.

In order to correct the time for existing time event, the user may tap at the field P10 to open a popover with the wheel selector to select hh:mm. The user may close the popover with a "Done" button.

To open a new time event, the user taps at the '+' or the field "time event", then popover comes up with all existing time events at the top. The user may tap at one time event, and then swipe in the selected time event with the wheel selector below with hh:mm Embodiments support not just creation of time events, but also changing time events as well by display all relevant information at the top. The planned working time may display Shift, shift text, begin time, and end time, for the selected day. A list of all time events for that day may be displayed with an abbreviation, and/or full text for time event.

Figure 11:
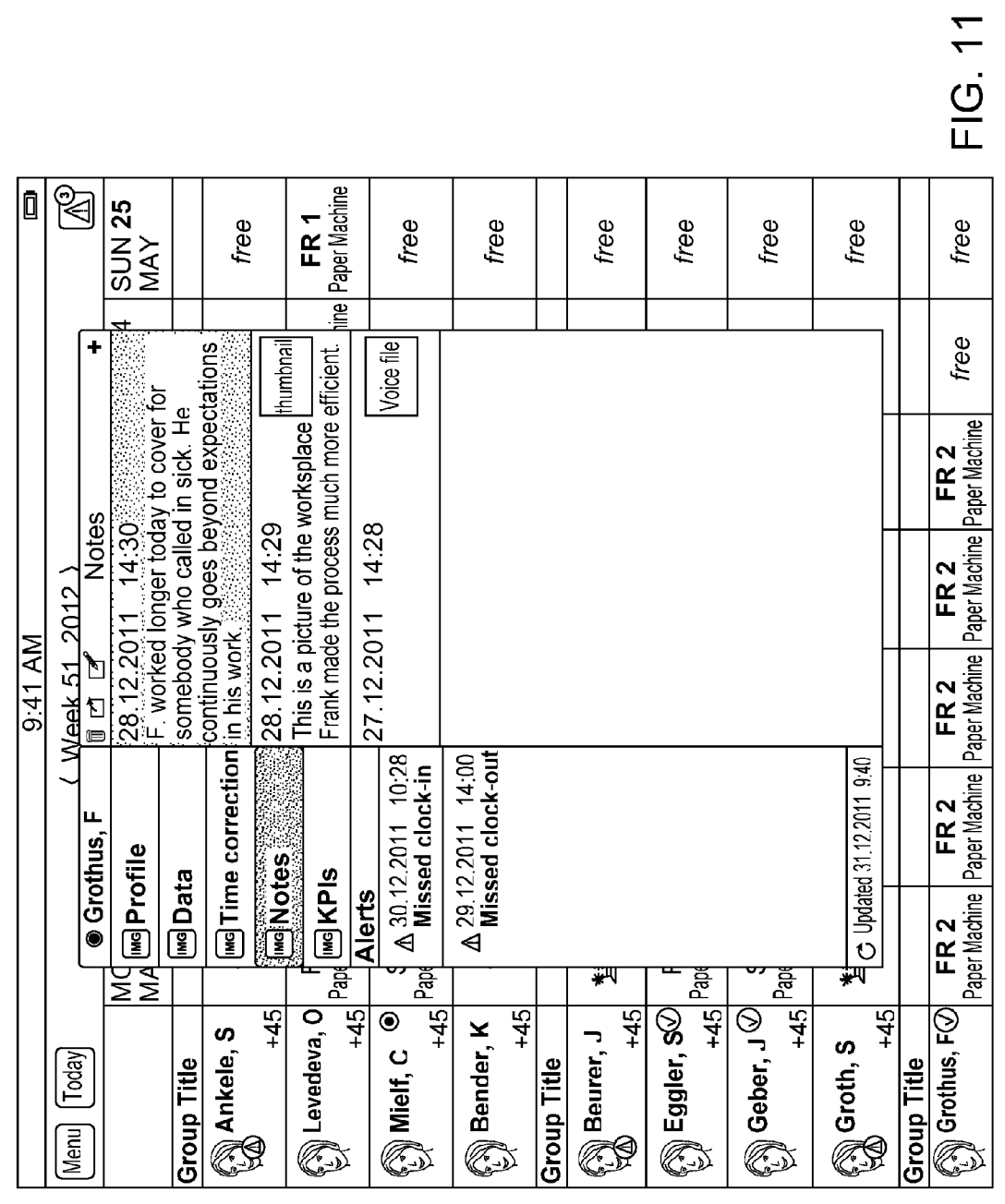
Figure 12:
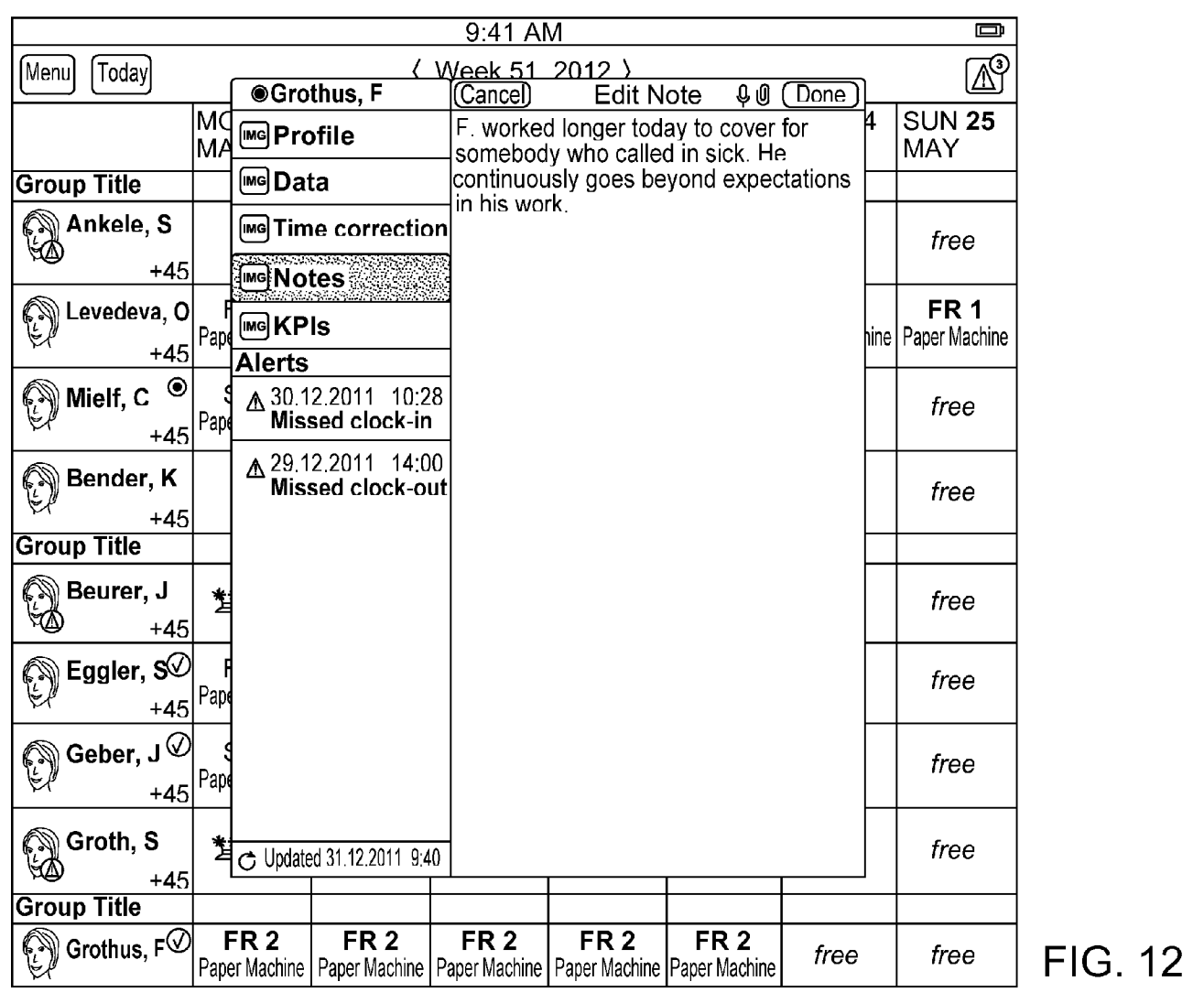

FIG. 11 shows a starting view of a process of editing employee details in the form of a list of notes. FIG. 12 shows an individual note. The first line of the note is the title.

Certain embodiments may show notes which have been formerly entered in the system (chronologically sorted by time stamp), with the newest note on top. Some embodiments may allow a user to enter a new note (date and time stamp included). Particular embodiments may allow a user to change and delete notes. Certain embodiments may provide for emailing of the note. It shall be possible to make a photo and attach it to a note. It shall be possible to leave a voice memo at a note. A note may include one or more icons indicating an email, a voice memorandum, or a photograph.

Figure 13:
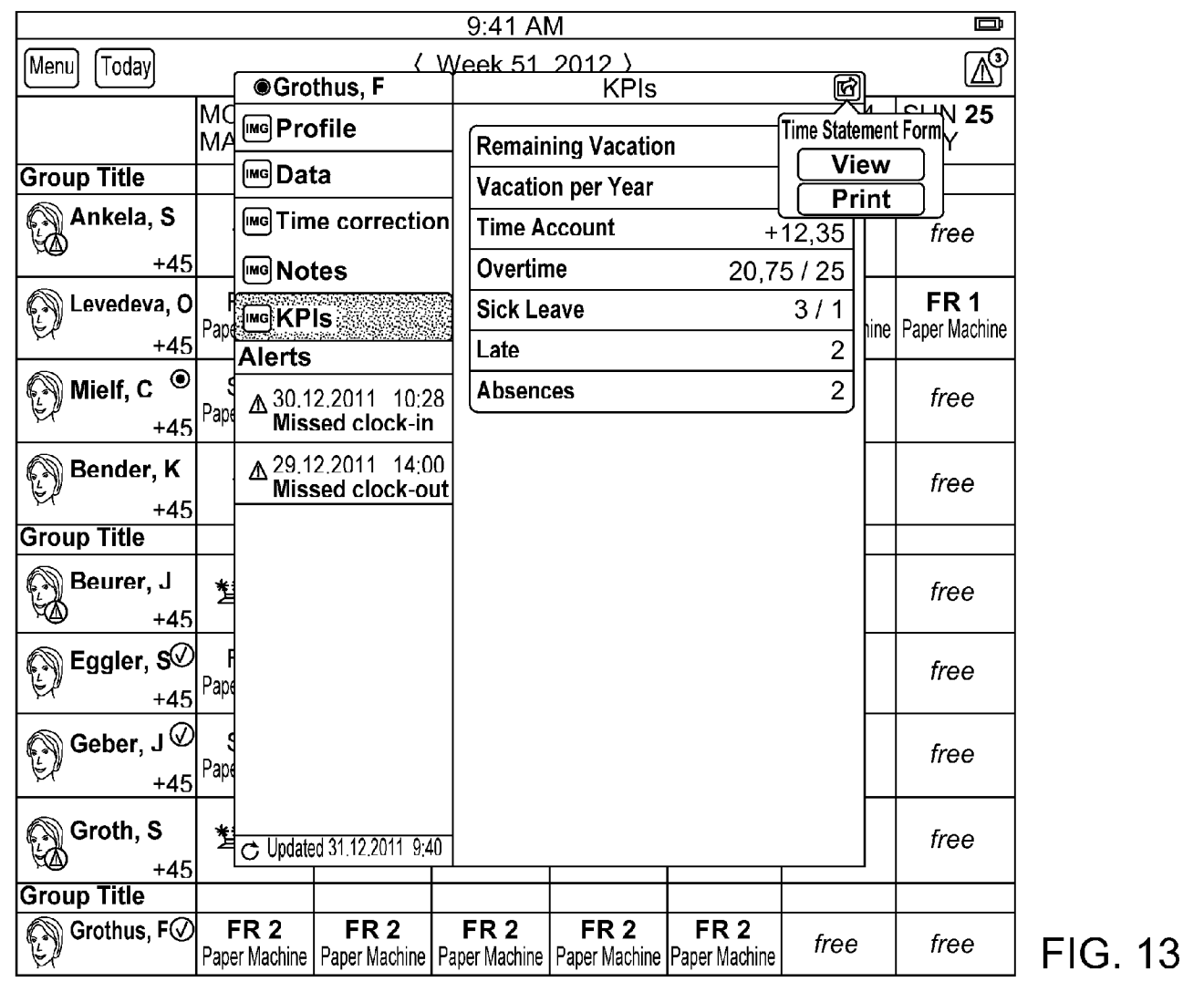

FIG. 13 shows a view of a process of editing employee details as time management statistics (KPIs). As used herein, the term KPI refers to relevant figures for analytics that may drive decision-making. One or more of the KPIs from the KPI View may be visible as well for the selected employee. The time statement may be opened from this window. The time statement may be sent to a printer.

Figure 14:
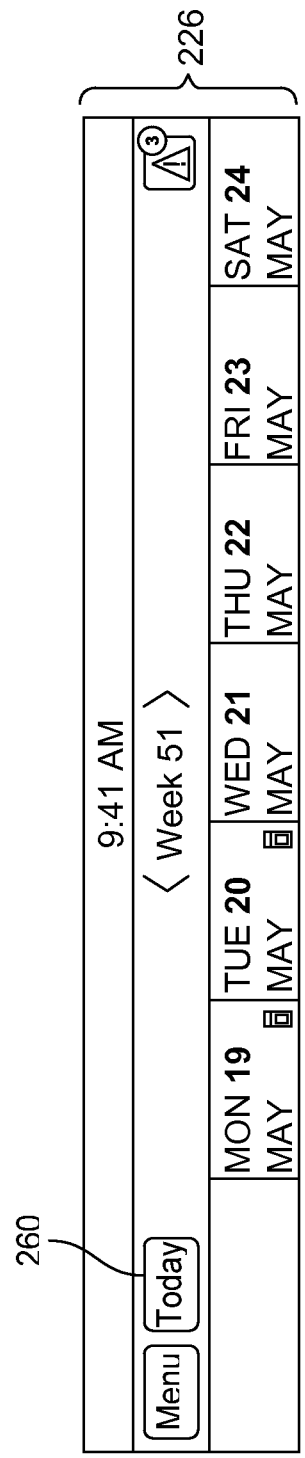
FIG. 14 shows a view of the toolbar of the week schedule.

FIG. 14 shows a view of the toolbar 226 of the week schedule. The toolbar may offer a menu as an icon 224, and an alert icon 227 including a number of alerts.

The calendar week may be displayed in brackets. Tapping on the calendar week allows entry of the calendar week and navigation to the entered calendar week. The toolbar may include an icon for paging (left to previous, or right to next week). Tapping at the day may allow navigation to the day schedule.

A note icon in the calendar bar may serve as an indicator for the existence of a note. A "Today" button 260 may facilitate returning to view the current day.

Figures 15, 16:
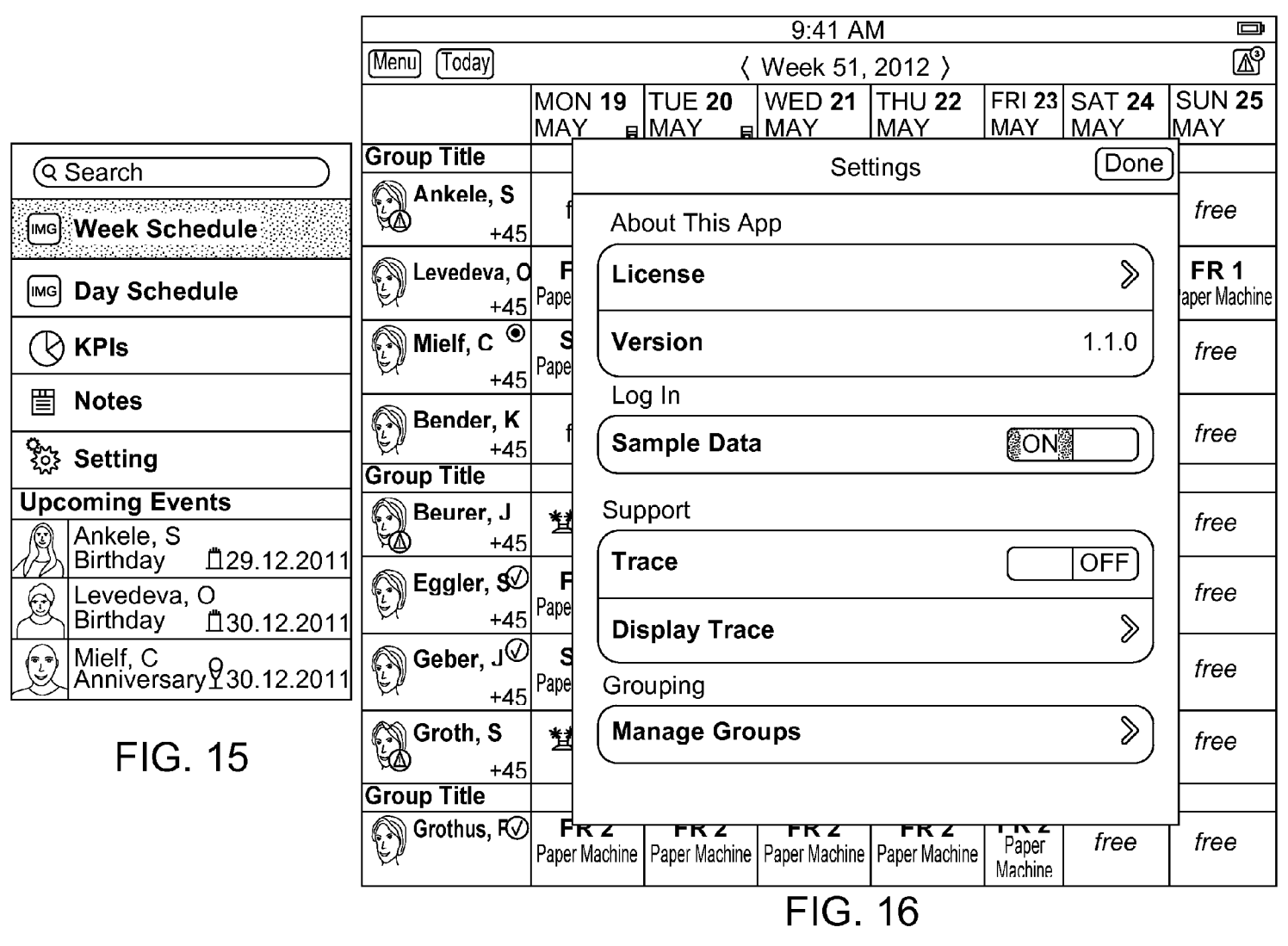

FIG. 15 shows the navigation panel including a settings option available for changing the settings. FIG. 16 shows the settings menu, with a grouping function available to create and manage groups (which may be sorted). Employees shall be possible to assign to groups, with an existing organization structure possibly serving as a default group. FIG. 17 shows a view allowing the editing of groups.

Other options available in the settings menu may be to push alerts, adjust time setting for availability status, set the default setting of home screen, and show a screen for user parameter.

As previously indicated, time management statistics (KPIs) may be accessible through the navigation panel and/or the business cards of individual team members. FIG. 18 is a screen shot showing a view of time management statistics in column form. Examples include productive time, planned time, working time, working hours per week, a flextime account, remaining leave, and leave entitlement.

In one or more of the views/panels indicated above, the employee name may comprise an active link to an employee profile including certain information, including contact and available skills. Clicking on an employee's name may thus allow display and editing of an employee's profile as is shown in FIG. 19.

Embodiments may offer a team calendar overview with shifts. This displays the availability and the schedule of the overall team to ensure that the supervisor always has a sufficient number of people at work.

Embodiments provide a KPI overview for the overall team, with balancing the working time. Providing KPIs like overtime accounts or leave accounts, and time balances, allows reduction and management of costs in a way to manage shifts to reduce overtime to give free shifts to those employees having too much overtime. In this manner, working time is seen as corresponding to costs, and supervisors may be able to check to see who might have less working time to do the work.

According to embodiments, the employee profile access gives the user (supervisor) an overview on the skill and as well communication information for a quick call. This allows rapid identification of who is the relevant person to be called, and their phone number.

Figure 20:
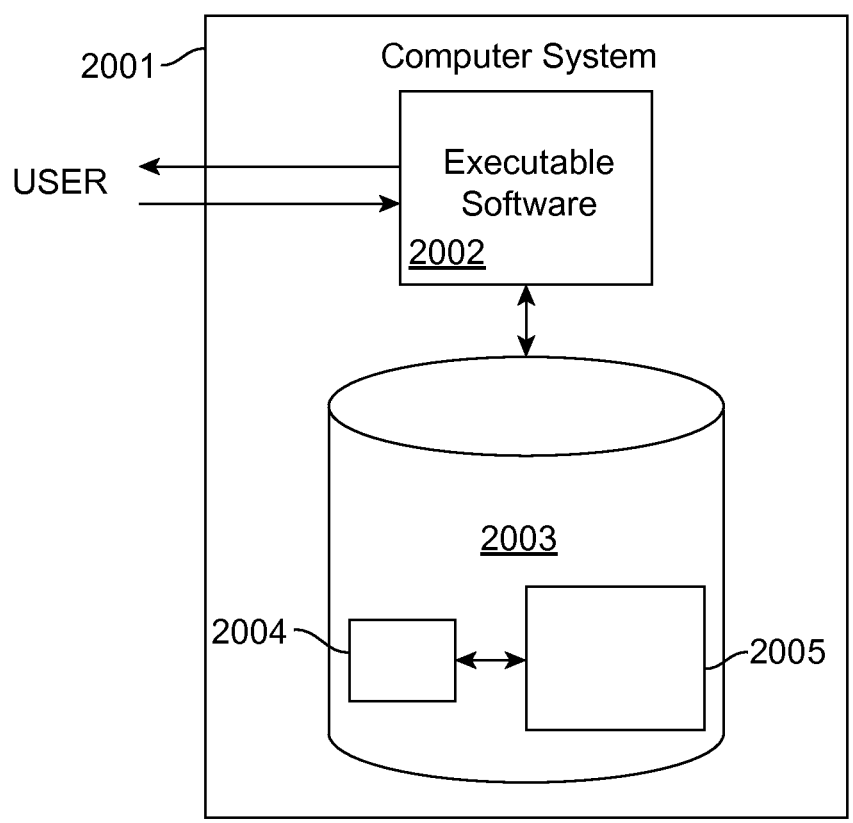
FIG. 20 illustrates hardware of a special purpose computing machine configured to perform workforce management according to one embodiment

FIG. 20 illustrates hardware of a special purpose computing machine configured to perform workforce management according to an embodiment. In particular, computer system 2000 comprises a view engine 2002 that is in electronic communication with a non-transitory computer-readable storage medium 2003. This computer-readable storage medium has stored thereon code 2005 corresponding to various aspects of displaying a view of workforce information to a user of a mobile device. Code 2004 corresponds to instructions for receiving updated workforce information from a user, and communicating same to a centralized server. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 21:
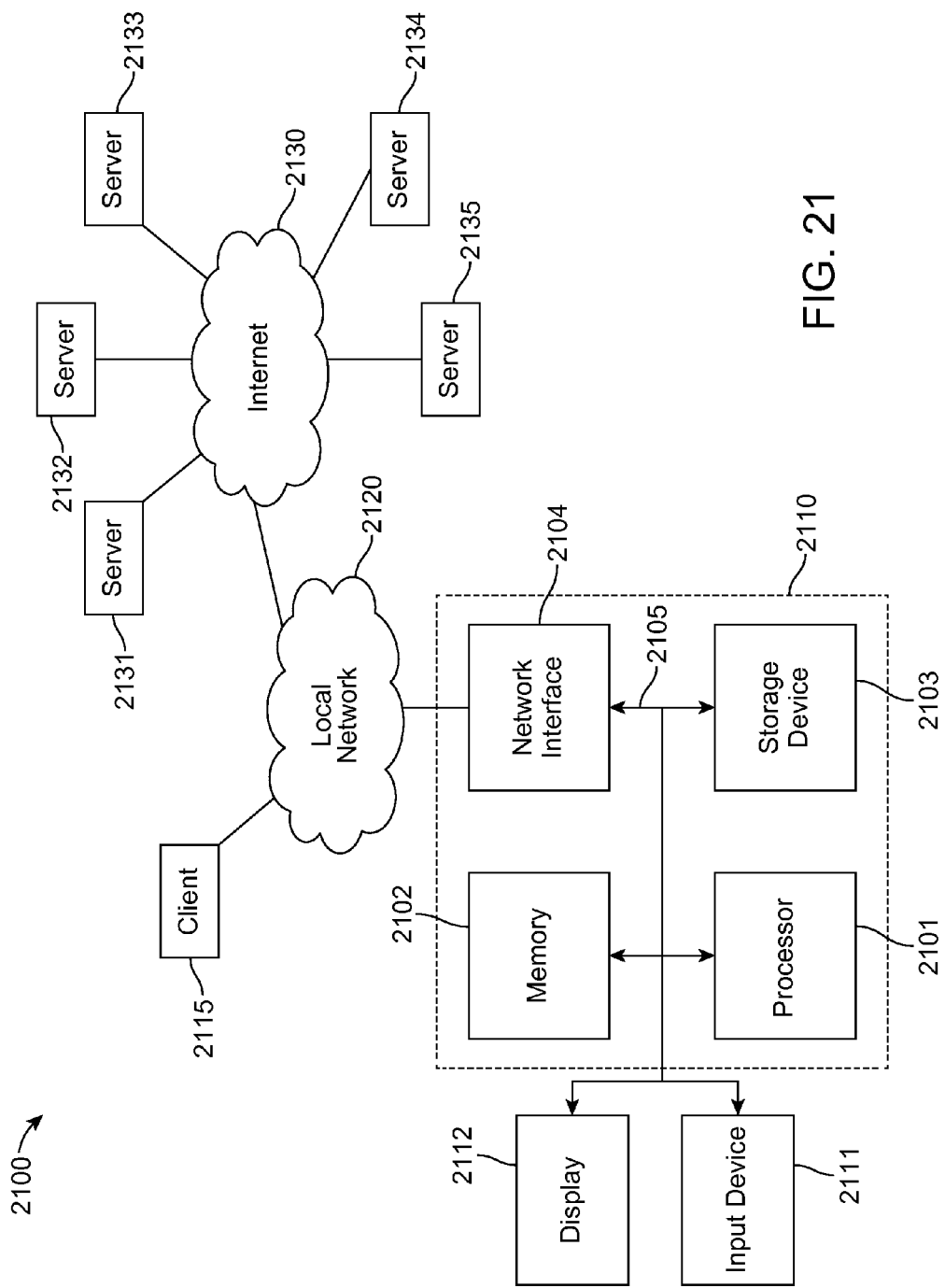
FIG. 21 illustrates an example of a computer system. .

An example computer system 2110 is illustrated in FIG. 21. Computer system 2110 includes a bus 2105 or other communication mechanism for communicating information, and a processor 2101 coupled with bus 2105 for processing information. Computer system 2110 also includes a memory 2102 coupled to bus 2105 for storing information and instructions to be executed by processor 2101, including information and instructions for performing the techniques described above, for example. This memory may also be used for storing variables or other intermediate information during execution of instructions to be executed by processor 2101. Possible implementations of this memory may be, but are not limited to, random access memory (RAM), read only memory (ROM), or both. A storage device 2103 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 2103 may include source code, binary code, or software files for performing the techniques above, for example. Storage device and memory are both examples of computer readable media.

Computer system 2110 may be coupled via bus 2105 to a display 2112, such as a cathode ray tube (CRT) or liquid crystal display (LCD), for displaying information to a computer user. An input device 2111 such as a keyboard and/or mouse is coupled to bus 2105 for communicating information and command selections from the user to processor 2101. The combination of these components allows the user to communicate with the system. In some systems, bus 2105 may be divided into multiple specialized buses.

Computer system 2110 also includes a network interface 2104 coupled with bus 2105. Network interface 2104 may provide two-way data communication between computer system 2110 and the local network 2120. The network interface 2104 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 2104 sends and receives electrical, electromagnetic, or optical signals that carry digital data streams representing various types of information.

Computer system 2110 can send and receive information, including messages or other interface actions, through the network interface 2104 across a local network 2120, an Intranet, or the Internet 2130. For a local network, computer system 2110 may communicate with a plurality of other computer machines, such as server 2115. Accordingly, computer system 2110 and server computer systems represented by server 2115 may form a cloud computing network, which may be programmed with processes described herein. In the Internet example, software components or services may reside on multiple different computer systems 2110 or servers 2131-2135 across the network. The processes described above may be implemented on one or more servers, for example. A server 2131 may transmit actions or messages from one component, through Internet 2130, local network 2120, and network interface 2104 to a component on computer system 2110. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
   causing a view engine in a portable electronic device, to obtain workforce information from a remote centralized storage medium, the workforce information relating to an absent employee and comprising employee-specific information selected from an employee preference;
   causing the view engine to display the workforce information on the portable electronic device to a user comprising a supervisor;
   causing the view engine to receive input from the user to change the workforce information;
   communicating updated workforce information reflecting an absence of the absent employee, from the portable electronic device to the remote centralized storage medium;
   in response to the updated workforce information, causing the view engine to receive from the remote centralized storage medium, a call list comprising contact information for an appropriate replacement employee based upon the employee preference;
   causing the portable electronic device to display the call list to the user;
   causing the view engine to provide an alert view for the user to create an alert identifying another supervisor based upon a conditional event comprising an unexpected presence at work of a replacement employee of the other supervisor indicated by a failure of the replacement employee to clock out; and
   causing the view engine to automatically send out the alert to the other supervisor based upon the updated workforce information satisfying the conditional event.

2. A method as in claim 1 further comprising causing the view engine to perform an operation upon the workforce information to generate the updated workforce information.

3. A method as in claim 2 wherein the operation comprises calculating a sum.

4. A method as in claim 1 further comprising causing the view engine to display an alert icon.

5. A method as in claim 1 wherein workforce information further comprises employee-specific information selected from a total number of vacation days, a number of vacation days already taken, a number of planned vacation days, a number of instances of delayed clock-in, a shift schedule, time management information, or an amount of overtime.

6. A method as in claim 1 wherein the workforce information further comprises employee-specific contact information.

7. A non-transitory computer readable storage medium embodying a computer program for performing a method, said method comprising:
   causing a view engine in a portable electronic device, to obtain workforce information from a remote centralized storage medium, the workforce information relating to an absent employee and comprising employee-specific information selected from an employee preference;
   causing the view engine to display the workforce information on the portable electronic device to a user comprising a supervisor;
   causing the view engine to receive input from the user to change the workforce information;
   communicating updated workforce information reflecting an absence of the absent employee, from the portable electronic device to the remote centralized storage medium;

in response to the updated workforce information, causing the view engine to receive from the remote centralized storage medium, a call list comprising contact information for an appropriate replacement employee based upon the employee preference;

causing the portable electronic device to display the call list to the user;

causing the view engine to provide an alert view for the user to create an alert identifying another supervisor based upon a conditional event comprising an unexpected presence at work of a replacement employee of the other supervisor indicated by a failure of the replacement employee to clock out; and causing the view engine to automatically send out the alert to the other supervisor based upon the updated workforce information satisfying the conditional event.

8. A non-transitory computer readable storage medium as in claim 7 wherein the method further comprises causing the view engine to perform an operation upon the workforce information to generate the updated workforce information.

9. A non-transitory computer readable storage medium as in claim 8 wherein the operation comprises calculating a sum.

10. A non-transitory computer readable storage medium as in claim 7 further comprising causing the view engine to display an alert icon.

11. A non-transitory computer readable storage medium as in claim 7 wherein workforce information further comprises employee-specific information selected from a total number of vacation days, a number of vacation days already taken, a number of planned vacation days, a number of instances of delayed clock-in, a shift schedule, time management information, or an amount of overtime.

12. A non-transitory computer readable storage medium as in claim 7 wherein the workforce information further comprises employee-specific contact information.

13. A computer system comprising:
one or more hardware processors;
a software program, executable on said computer system, the software program configured to:
cause a view engine in a portable electronic device, to obtain workforce information from a remote centralized storage medium, the workforce information relating to an absent employee and comprising employee-specific information selected from an employee preference;

cause the view engine to display the workforce information on the portable electronic device to a user comprising a supervisor;

cause the view engine to receive input from the user to change the workforce information;

communicate updated workforce information reflecting an absence of the absent employee, from the portable electronic device to the remote centralized storage medium;

in response to the updated workforce information, cause the view engine to receive from the remote centralized storage medium, a call list comprising contact information for an appropriate replacement employee based upon the employee preference;

cause the portable electronic device to display the call list to the user;

cause the view engine to provide an alert view for the user to create an alert identifying another supervisor based upon a conditional event comprising an unexpected presence at work of a replacement employee of the other supervisor indicated by a failure of the replacement employee to clock out; and cause the view engine to automatically send out the alert to the other supervisor based upon the updated workforce information satisfying the conditional event.

14. A computer system as in claim 13 wherein the view engine is further configured to perform an operation upon the workforce information to generate the updated workforce information.

15. A computer system as in claim 14 wherein the operation comprises calculating a sum.

16. A computer system as in claim 13 wherein the view engine is further configured to display an alert icon.

17. A computer system as in claim 13 wherein workforce information further comprises employee-specific information selected from a total number of vacation days, a number of vacation days already taken, a number of planned vacation days, a number of instances of delayed clock-in, a shift schedule, time management information, or an amount of overtime.

* * * * *